Dec. 5, 1944.   E. G. STAUDE   2,364,324
BLANK COUNTER
Filed Aug. 28, 1942   5 Sheets-Sheet 2
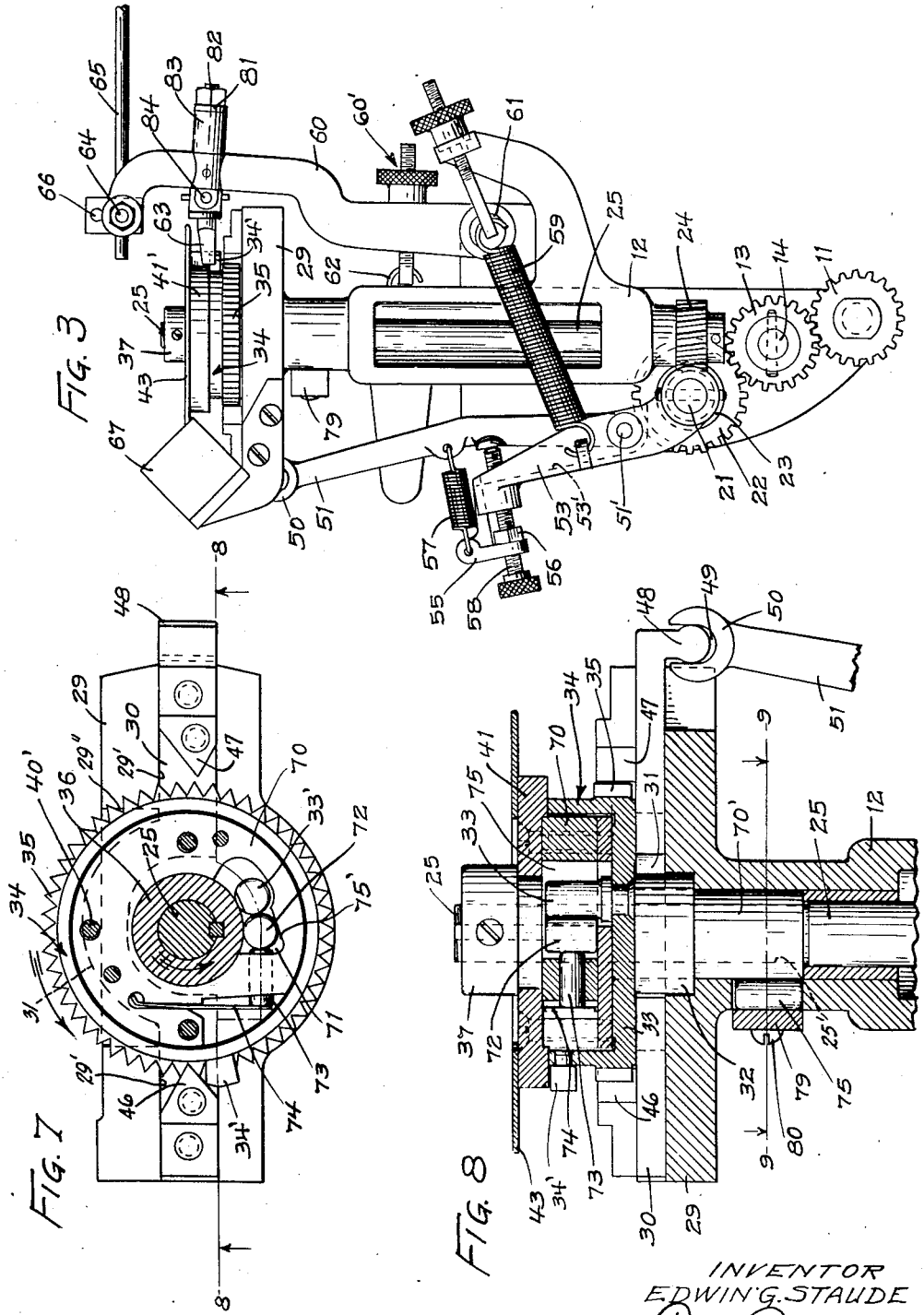
INVENTOR
EDWIN G. STAUDE
BY Paul, Paul & Moore
ATTORNEYS Dec. 5, 1944.   E. G. STAUDE   2,364,324
BLANK COUNTER
Filed Aug. 28, 1942    5 Sheets-Sheet 3
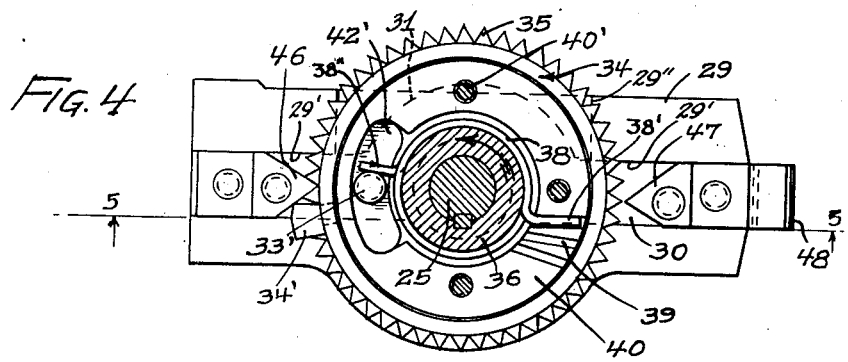
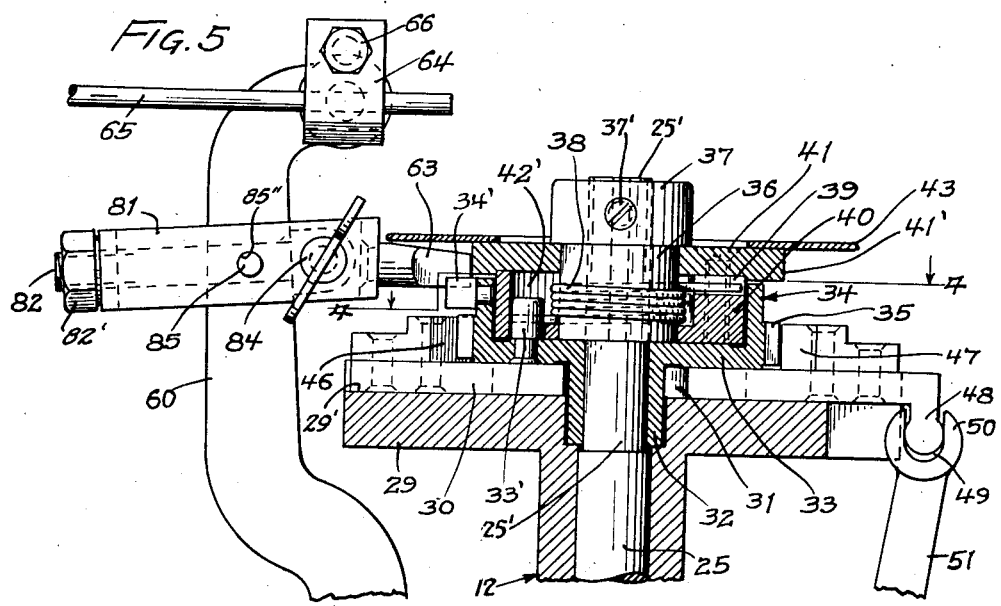
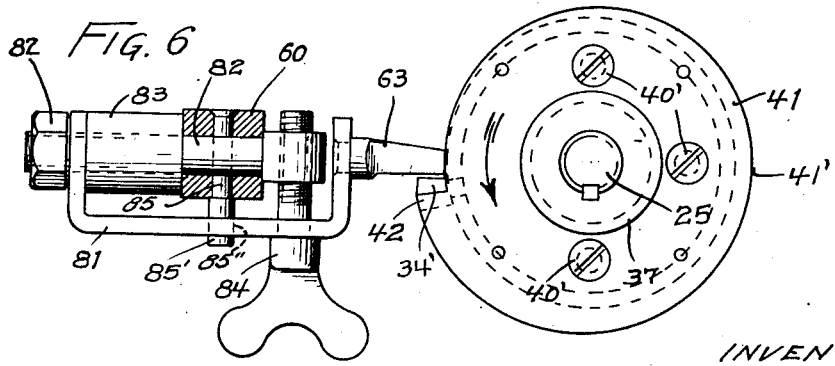
INVENTOR
EDWIN G. STAUDE
ATTORNEYS Dec. 5, 1944.    E. G. STAUDE    2,364,324
BLANK COUNTER
Filed Aug. 28, 1942    5 Sheets-Sheet 4
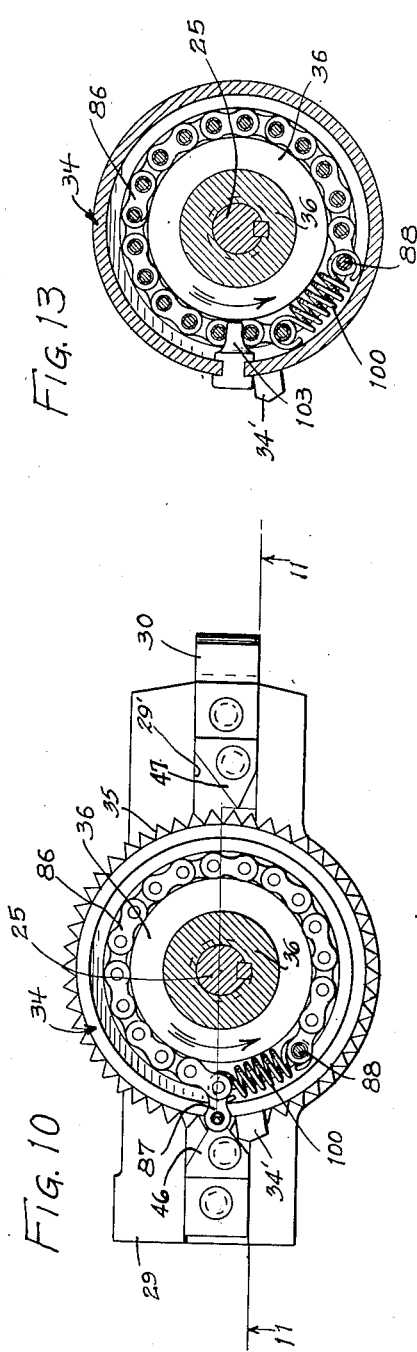
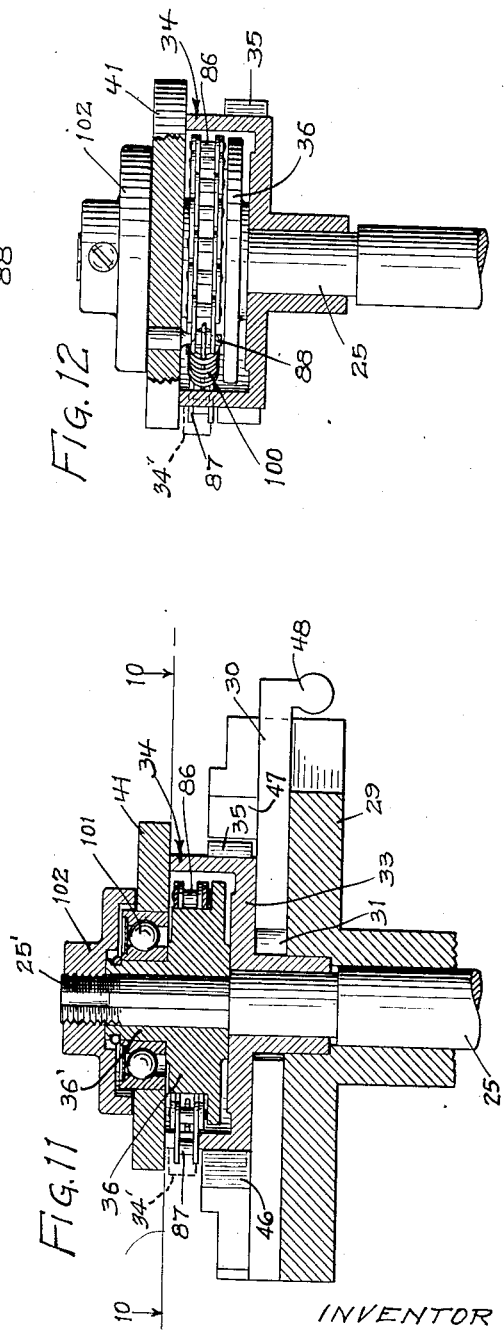
INVENTOR
EDWIN G. STAUDE
BY Paul, Paul & Moore
ATTORNEYS Dec. 5, 1944. E. G. STAUDE 2,364,324
BLANK COUNTER
Filed Aug. 28, 1942 5 Sheets-Sheet 5

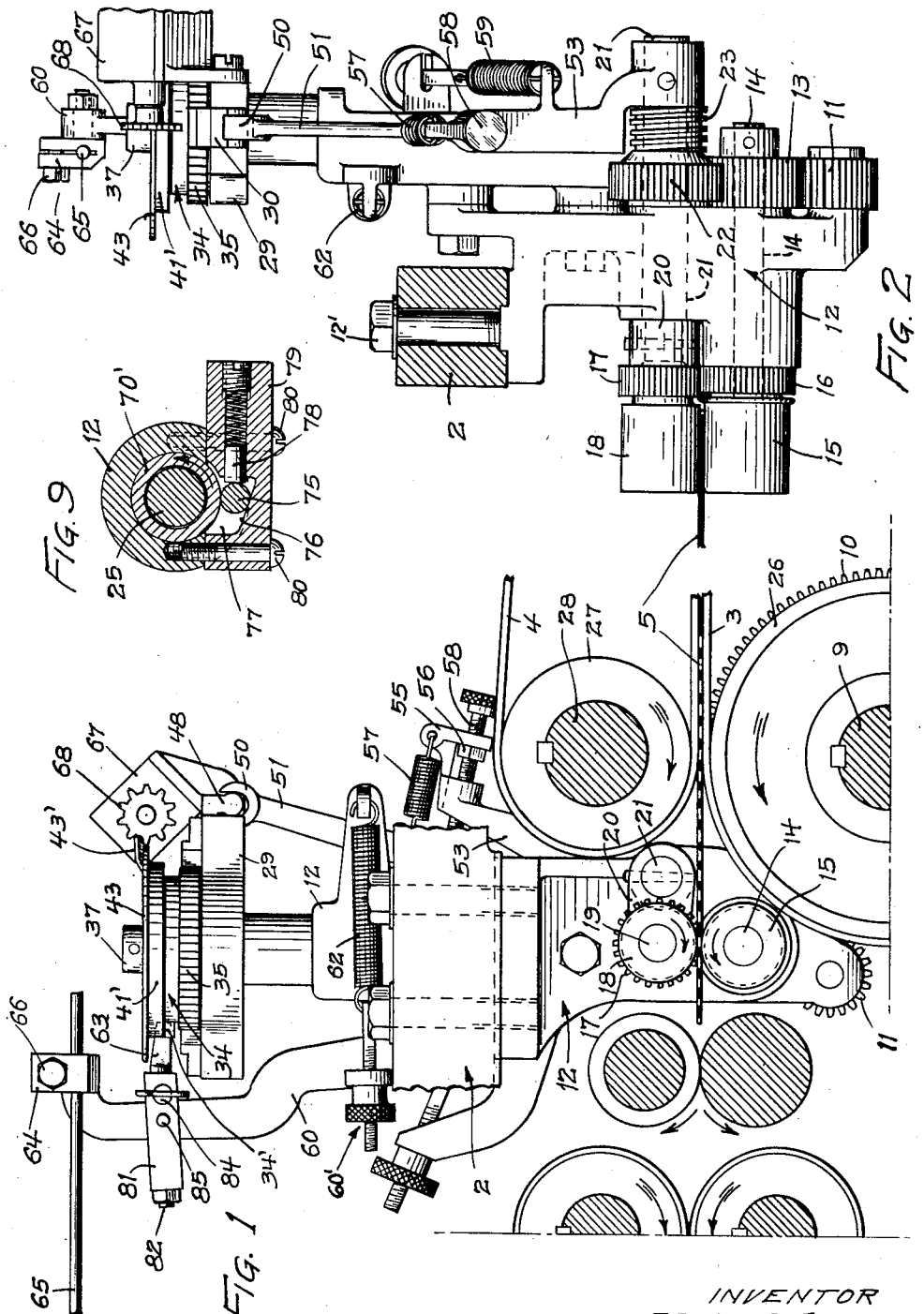

INVENTOR
EDWIN G. STAUDE
BY Paul, Paul & Moore
ATTORNEYS

Patented Dec. 5, 1944

2,364,324

UNITED STATES PATENT OFFICE 2,364,324

BLANK COUNTER

Edwin G. Staude, Minneapolis, Minn.

Application August 28, 1942, Serial No. 456,512

15 Claims. (Cl. 93—93)

This invention relates to new and useful improvements in counting mechanisms of the general type disclosed in my Patent No. 1,154,451, granted September 21, 1915.

It is important that blank counting mechanisms used in connection with paper fabricating machines be so constructed that they may be operated at high speed so as to keep an accurate record of the operation of the machine. They must also be so constructed as to accurately count the total number of articles passing through the counting mechanism, and at the same time indicate the count in selected multiples of the total count as, for example, every 25th, 50th, 75th or 100th article on the line of blanks or articles being fed through the counting mechanism from the fabricating machine, will be partially "kicked out" of its normal path of travel, as the articles are delivered onto a slow traveling receiving conveyor in overlapped relation, whereby each blank thus partially kicked out of the moving row of lapped articles will project laterally from the row of articles on the receiving conveyor, and will, in effect, divide the articles on the conveyor into groups, each such group containing a predetermined number of articles, whereby an attendant may quickly and conveniently remove the articles from the conveyor in groups of a known number of articles, and place them in a suitable receiving means, such as an automatic bundle tying machine.

While the counting mechanism disclosed in my above mentioned patent did operate successfully, some difficulty was experienced with the friction drive which operates the escapement mechanism for actuating the counter, because it was difficult to maintain the correct frictional driving engagement between the operating parts of said drive, as a result of wear and for other reasons, and the drive therefore required frequent adjustment to maintain the correct driving relationship between the various parts thereof. Such adjustment usually required the services of a skilled operator, because, if not properly performed, the counting mechanism might fail in accuracy.

It was therefore deemed advisable to design and construct an improved drive for an article counting mechanism in which the objectionable features present in the above mentioned patent, would be eliminated, and the novel article counter driving mechanism disclosed in the present application is an exemplification of such a drive.

The primary object of the present invention, therefore, is to provide an efficient and practical driving means for an article counting mechanism adapted to record a total count of all articles fed therethrough, and which also includes a count indicator, said driving means being so designed and constructed that it may be operated efficiently and accurately over a long period of time without requiring numerous and periodic adjustments by a skilled attendant.

A further object of the invention is to provide a driving means for an article counting mechanism, comprising a non-adjustable follow-up power actuator or clutch adapted to operate a total count mechanism and also a count indicator, preferably located at the receiving end of the conveyor for receiving the counted articles in overlapped relation from the paper fabricating machine.

A further object is to provide a driving means for an article counter which, while embodying springs as a means for actuating certain parts thereof, does not require periodic adjustment of such springs, and of other parts thereof, when the driving means is in operation, its construction being such that once the parts thereof have been accurately adjusted with respect to one another, the driving means may be operated for long periods without servicing and without the necessity of making frequent adjustments, as was more or less common with the counting mechanism disclosed in the patent hereinbefore mentioned.

A further object is to provide a novel driving means for an article counting mechanism, which driving means includes an automatically operable friction clutch which is so designed that it may be partially released, during a portion of each cycle of operation of the escapement mechanism, thereby to relieve the parts of unnecessary wear, and also whereby the pressure of the counting rollers on the articles will be greatly reduced to prevent marking the fine printing on the articles.

A further and more specific object of the invention resides in the provision of an improved driving mechanism for an article counter, comprising an escapement wheel having an escapement bar or slide operatively connected therewith for controlling the operation of the escapement wheel, said escapement bar or slide mounted for sliding movement with respect to the escapement wheel by a pivoted lever arranged to be oscillated by the passage of the blanks through the counting mechanism, and said driving means also including a constantly rotating shaft having a follow-up power actuator or clutch device operatively connecting it to the escapement wheel, which escapement wheel controls the power actuator, which in turn operates the cam mechanism which actuates the total count counter and a count indicator because the fixed end of the power actuator is secured to said cam whereas the loose or control end of the actuator is attached to the escapement wheel. This results in a very light effort on the part of the counting rollers to control the escapement wheel, which in turn controls power application to the cam to keep the cam continuously advanced to keep up with the escapement wheel. The function of this device is quite different from that shown and described in Patent No. 1,154,451, where the entire force of the friction clutch is always against the escapement wheel with continued force with no provision of cutting off the force when not required, whereas in this application the escapement wheel releases the force or power on the cam when not required.

A further object is to provide an improved driving means for a blank or article counting mechanism, comprising means for exerting a sensitive, uniform driving effort on the escapement wheel in a forward direction, irrespective of the load on the total count and count indicator cams.

A further object is to provide an improved driving means of the character disclosed which, when properly installed, will not require adjustment of the power actuator by an attendant, because no adjustment is provided for, and therefore the driving means is not likely to become inoperative, as a result of improper adjustments by an incompetent attendant or operator.

Other objects of the invention reside in the simple and inexpensive construction of the driving means, as a whole, and whereby the article counter driving mechanism will require very little attention on the part of an operator, when in operation; in the provision of a simplified article counter driving mechanism which is so constructed that the co-acting rollers between which the articles must pass to actuate the counting mechanism, are so arranged that they are not required to exert sufficient pressure upon the articles to damage fine lithographic work; and in the provision of an article counting mechanism which may be operated at high speed to accurately record a total count of articles passing therethrough, and which also includes a count indicator adapted to divide the articles into groups, each having a predetermined number of articles therein, whereby the operation of removing the counted articles from the conveyor and placing them in a bundle tying machine, is greatly facilitated.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a sectional elevation of the discharge end of a folding paper box machine, showing my improved counter mounted thereon;

Figure 2 is an end view of the counter mechanism looking in the direction of article travel;

Figure 3 is a side view of the counting mechanism, looking at it from the side opposite from that shown in Figure 1;

Figure 4 is a sectional plan view on the line 4—4 of Figure 5, showing the relationship between the clutch device and the escapement wheel or member;

Figure 5 is a sectional elevation on the line 5—5 of Figure 4;

Figure 6 is a plan view showing the cam for operating the count indicating means, and also showing the means for adjusting or timing the drop-off member with respect to the cam;

Figure 7 is a view similar to Figure 4, showing a clutch device of different construction;

Figure 8 is a detail sectional view on the line 8—8 of Figure 7;

Figure 9 is a detail sectional view on the line 9—9 of Figure 8;

Figure 10 is a sectional plan view on the line 10—10 of Figure 11, showing a chain type clutch device;

Figure 11 is a detail sectional view on the line 11—11 of Figure 10;

Figure 12 is an elevational view similar to Figure 11, with some of the parts omitted, and partially broken away to more clearly illustrate the connection between the clutch chain and the cam plate;

Figure 13 is a sectional plan view similar to Figure 10, but showing the chain connected to the escapement wheel in a slightly different manner;

Figure 15:
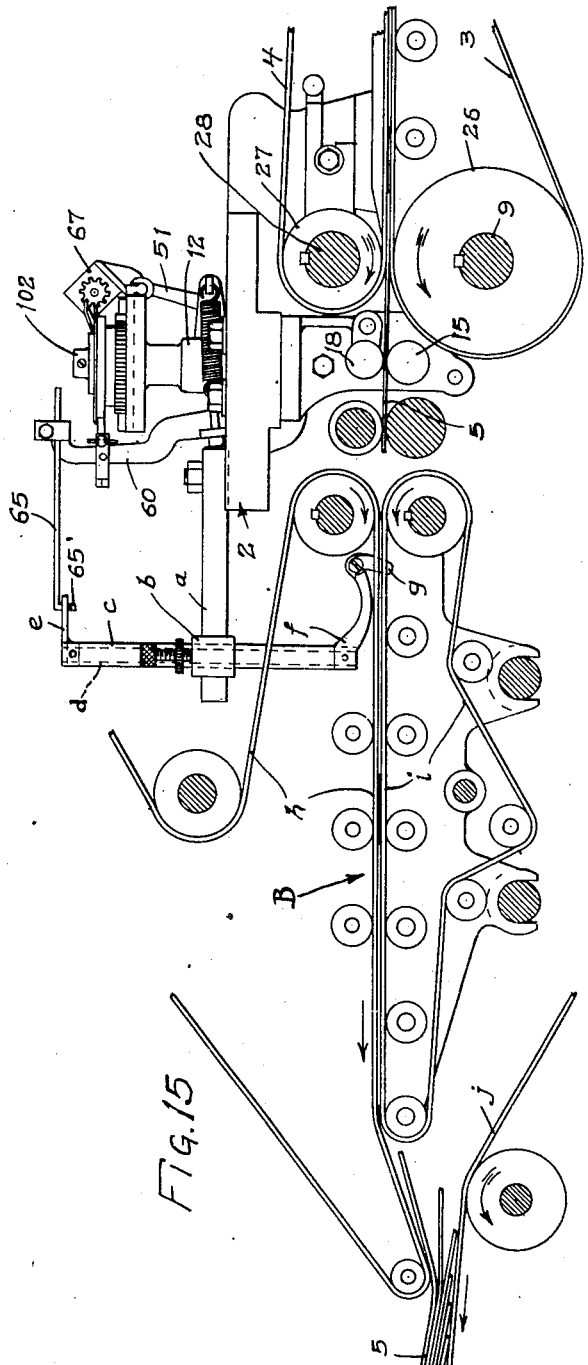
Figure 15 is a sectional elevation of the discharge end of a folding paper box machine with the box counting mechanism mounted thereon, and showing the count indicating mechanism positioned adjacent to the receiving conveyor.

In the selected embodiment of the invention herein disclosed, there is illustrated in Figures 1 and 15, for purposes of disclosure, the discharge end of a paper box making machine, generally designated by the numeral 2, and which is similar to the one disclosed in my hereinbefore mentioned Patent No. 1,154,451. The box or article making machine 2 includes a pair of endless conveyor belts 3 and 4, between which the boxes or articles 5 are fed through the machine, as will be understood by reference to the drawings. The conveyor belts 3 and 4 are supported at one end of the machine on suitable pulleys or wheels 26 and 27, respectively, secured to cross shafts 9 and 28, as illustrated in Figure 15. A suitable gear 10 is mounted on the shaft 9 and meshes with a pinion 11 carried by a suitable bracket 12, secured to the frame 2 of the box or article making machine by suitable bolts 12', as shown in Figures 1 and 2.

The pinion 11 is supported on a stud secured in the lower portion of the bracket 12, and meshes with a pinion 13 secured to a shaft 14 journaled in the bracket 12, as will be understood by reference to Figure 2. A suitable roller 15 is secured to the opposite end of the shaft 14, and is provided at its inner end with a suitable gear wheel 16 which meshes with a similar gear 17, secured to one end of a roller 18. The roller 18 is preferably slightly smaller in diameter than the roller 15, and has a slightly narrower face, as shown in Figure 2. The roller 18 is mounted on a stud 19 carried by a crank arm 20 shown secured to one end of a rock shaft 21 journaled in the bracket 12. An idler gear 22 is mounted for relative rotation on the shaft 21, and meshes with the pinion 13, as shown in Figure 3. The idler gear 22 is provided at one end with a suitable worm 23 which meshes with a worm gear 24 secured to the lower end of an upright shaft 25, journaled in suitable bearings provided in the supporting bracket 12, as best shown in Figure 3. From the foregoing, it will be understood that the shaft 25 will rotate continuously, when the article making machine 2 is in operation, because of having a fixed driving connection with the gear 10 on the shaft 9 through the chain of gears 11, 13, 22, 23 and 24.

To support the article counter and count indicating mechanisms, the upper portion of the supporting bracket 12 is shown provided with an elongated head 29, having a longitudinally extending recess 29' therein which provides a guideway for a slide 30, mounted for sliding movement therein. The guideway 29' intersects the axis of the shaft 25, as shown in Figure 4, and the intermediate portion of the slide 30 is therefore offset, as indicated at 31 in Figures 4 and 5, to clear the shaft 25 and parts secured thereto. The upper face of the head 29 is relieved on one side to receive the offset portion 31 of the slide 30, as shown at 29'' in Figure 4.

A member 34, having a bottom wall 33 and a depending hub 32, is mounted for relative rotation upon the upper reduced end portion 25' of the shaft 25, as shown in Figure 5. For the sake of clarity, the member 34 will hereinafter be referred to as an escapement wheel. The periphery of the escapement wheel 34 is provided with circumferentially spaced teeth 35 adapted to be alternately engaged by suitable wedge-shaped teeth 46 and 47 provided on the slide 30, when the slide is reciprocated.

One of the important features of the present invention resides in the provision of a suitable clutch device within the escapement member 34, which serves to intermittently transmit power from the constantly rotating shaft 25 to the cam means, subsequently to be described, thereby to reduce to a minimum, the pressure exerted on the articles by the rollers 15 and 18 to operate the escapement wheel, and whereby there is little or no danger of the rollers 15 and 18 marking or otherwise damaging the fine printing and characters which may have been printed on the articles before passing through the counting mechanism. There are various forms of clutch devices which may be used for this purpose.

In Figures 4 and 5 I have shown a clutch device comprising a cylindrical driving collar 36 which is keyed or otherwise fixed to the upper reduced end portion 25' of the shaft 25. The lower face of the collar 36 is spaced upwardly from the upper face of the head 29 of the bracket 12, thereby to provide a running fit for the wall portion 33 between the collar 36 and head 29. A retaining collar 37 is received in threaded engagement with the uppermost end of the reduced portion 25' of the shaft 25, and may be fixed or locked thereto by such means as a lock screw 37'.

A clutch spring 38 is snugly wound about the driving collar 36 whereby it is normally frictionally engaged with the periphery of the collar 36. The spring 38 has one end 38' extending radially into one of a series of radial grooves 39 provided in a cam-supporting member 40, mounted for relative rotation within the escapement wheel 34. A cam plate 41 is secured to the upper face of the supporting member 40 by suitable screws 40'. The member 40 and cam plate 41 are provided with aligned bores adapted to receive the drive collar 36, whereby said collar serves as a bearing therefor.

The periphery of the cam plate 41 is shown shaped in the form of a spiral, which terminates in an abrupt shoulder or drop-off 42, as best shown in Figure 6. A thin disc 43 is fixedly secured to the cam plate 41 for simultaneous rotation therewith. The disc 43 has a cam-shaped edge portion 43', shown in Figure 1, adapted to engage the toothed wheel 68 of a suitable counter, generally designated by the numeral 67.

The cam portion 43' of the disc 43 is adapted to operate the wheel 68 of the counter 67, one tooth for each revolution of the cam disc 43 and cam plate 41. The combined weights of the cam-supporting member 40 and cam plates 41 and 43 are supported on the bottom wall 33 of the escapement member 34, and, as hereinbefore stated, these parts are retained in axial alignment with the shaft 25 by the drive collar 36.

An upright stud 33' is fixed to the bottom wall 33 of the escapement wheel 34 and is received in an arcuately formed clearance slot 42' provided in the cam-supporting member 40, as will readily be understood by reference to Figures 4 and 5. The opposite end 38'' of the clutch spring 38 is adapted to engage the trailing side of the stud 33'. The spring 38 is so wound up on the drive collar 36, that when in its normal position thereon the spring will engage the collar 36 with sufficient friction to provide a driving connection between the spring and collar, whereby rotary movement may be imparted to the cam-supporting member 40 and cam plates 41 and 43, as a result of the spring end 38' being operatively engaged with the member 40, as hereinbefore stated, and as shown in Figures 4 and 5.

It will thus be seen that the cam-supporting member 40 is intermittently driven from the shaft 25, through the clutch spring 38 and drive collar 36, and not directly from the escapement wheel 34. When, however, the end 38'' of the spring 38 engages the stud 33' of the escapement wheel 34, which may be momentarily at rest, as shown in Figure 4, continued rotation of the collar 36 will cause the clutch spring to partially unwind and release its driving engagement with the collar 36, whereby rotation of the spring with the collar will be temporarily interrupted.

Such temporary interruption of the driving engagement of the spring 38 with the collar 36 is terminated when the slide 30 rotates the escapement wheel 34, which causes the stud 33' to advance in a direction away from the spring end 38'', whereby the spring contracts and thereby drivingly engages the collar 36, and thus again drives the cam-supporting member 40 and the escapement wheel 34. In other words, as the escapement wheel 34 is normally stationary, and as the clutch spring 38, when in its normal condition, tends to rotate with the drive collar 36 as a result of its frictional driving engagement therewith, the end 38'' of the spring is constantly being urged forwardly against the stud 33' whereby the spring is intermittently unwound sufficiently to lose its driving engagement with the collar 36. As the escapement wheel is intermittently actuated by reciprocal movement of the slide 30, the end 38'' of the clutch spring 38 is periodically released to permit the clutch spring to drivingly grip the collar 36 and thereby advance the cam plates 41 and 43 a distance equal to one tooth of the escapement wheel, through the power of the drive shaft 25.

The spring 38 is so wound that when it is expanded, or is in non-driving relation with respect to the drive collar 36, as shown in Figure 4, the spring will still lightly engage the periphery of the drive collar 36 with sufficient friction to constantly exert a very light driving force upon the cam-supporting member 40 and escapement wheel 34, when these parts are momentarily at rest, as shown in Figure 4. This light frictional engagement of the spring with the drive collar 36, when the escapement wheel 34 and member 40 are momentarily at rest, causes the escapement wheel 34 to instantly respond to reciprocal movement of the escapement slide 30, which renders the drive for the cams 41 and 43 very sensitive and accurate in operation, and with the assurance that the rollers 15 and 18, which operate the arm 51 of the escapement slide 30, will exert but a very light pressure upon the blanks or articles as they are fed therebetween, as shown in Figure 1.

It will thus be understood that with each complete movement of the slide 30, the escapement wheel 34 will rotate one full tooth, and simultaneously the clutch spring 38, as a result of its frictional driving engagement with the drive collar 36, will rotate the cam plates one step. The operation of the clutch device, which comprises the drive collar 36 and clutch spring 38, is thus automatically controlled by the intermittent operation of the escapement wheel 34 by reciprocal movement of the slide 30.

From the foregoing, and by reference to Figures 4 and 5, it will be evident that the continuously rotating drive collar 36 will form with the spring 38, a friction clutch drive for the cam supporting member 40, and thereby urge the escapement wheel 34 forwardly through the action of the end 38'' of the spring engaging pin 33', the escapement wheel being intermittently actuated by the reciprocal movement of the slide 30, whereby the escapement wheel will rotate one full tooth for each complete stroke of the slide 30. The spacing between the innermost edges of the wedge-shaped teeth 46 and 47 of the slide 30 is less than the outside diameter of the teeth 35 of the escapement wheel 34, whereby when one of the wedge-shaped teeth on the slide is moved out of engagement with a tooth of the escapement wheel, the wedge-shaped tooth adjacent to the opposite end of the slide will be moved into engagement with the teeth on the opposite side of the escapement wheel, as clearly shown in Figure 4. In other words, the wedge-shaped teeth 46 and 47 on the slide 30, and the circumferentially spaced teeth on the escapement wheel 34, function as a conventional escapement mechanism in that when the slide is reciprocated in its guideway, it will intermittently rotate the escapement wheel 34.

The means provided for actuating the escapement slide 30 is best shown in Figures 3 and 5, and comprises an arm 53 secured to the shaft 21 adjacent to the worm 23, as clearly shown in Figure 2. The arm 53 is shown provided with a suitable recess 53' adapted to receive the lower end of a lever 51, pivoted to the arm 53 intermediate its ends by a suitable pivot pin 51'. The upper end portion 50 of the lever 51 is preferably formed with a fork 49 adapted to receive a depending lug 48 on the slide 30, as illustrated in Figure 5.

An adjusting screw 58 is received in threaded engagement with the upper end portion of the arm 53 and engages the lever 51, as shown in Figure 3, whereby the arm 53 may be relatively adjusted with respect to the lever 51, thereby to accurately position the blank engaging roller 18 with respect to its complemental roller 15, and whereby the spacing between the peripheries of the rollers 15 and 18 may be adjusted to accommodate the thickness of the paper blanks or articles to be fed therebetween. Adjustment of the screw 58 also serves to accurately adjust the slide with respect to the escapement wheel 34.

A finger 55 is mounted on the adjusting screw 58 and bears against a collar or nut 56 received in threaded engagement with the screw 58, as shown in Figure 3. One end of a suitable spring 57 is attached to the finger 55, and the opposite end of said spring is attached to the lever 51, whereby the terminal of the adjusting screw 58 is constantly retained in engagement with the lever 51, as will readily be understood by reference to Figure 3. The spring 57 also serves to hold the lever 51 against the adjusting screw 58 with a yielding pressure whereby the lever may swing on its pivot 51' to accommodate variant thicknesses of blanks or articles passing between the rollers 15 and 18.

The arm 53 is oscillated by movement of the roller 18, when a blank passes between said roller and its complemental roller 15, against the tension of a spring 59. The spring 59 has one end attached to the arm 53, and its opposite end to an eye bolt mounted for longitudinal adjustment in a portion of the frame 12 of the counting mechanism, whereby the tension in the spring may be varied to suit conditions. See particularly Figure 3.

Because the actual work of rotating the cams 41 and 43 is accomplished by the power-driven clutch spring 38, through its frictional driving engagement with the drive collar 36, and also because the spring 38, when in expanded condition, as shown in Figure 4, engages the collar with sufficient friction to exert a light driving force against the member 40 and the escapement wheel 34, the operations of the escapement wheel and cam-supporting member 40 are not dependent upon the tension in the spring 59. This spring need only be tensioned sufficiently to enable it to operate the escapement slide 30 in one direction, which requires very little effort because of the escapement wheel being partially driven by the clutch spring 38. Oscillation of the arm 51 as a result of the roller 18 engaging a blank or article, will reciprocate the slide 30 in the operation. By arranging the parts as above described, adjustment of the springs 57 and 59 is not critical, and when once adjusted, may require no further attention.

A count indicator is also provided in combination with the total blank or article counter 67, shown in Figure 1, and comprises means for laterally "kicking" or displacing selected blanks or articles out of their normal path of travel, as they are delivered onto the receiving conveyor, diagrammatically illustrated at B in Figure 15, and whereby the blanks or articles delivered onto the receiving conveyor will be divided into groups, each group containing a predetermined number of blanks as, for example, 25, 50, 75, 100, and so on.

The count indicating or blank displacing means is shown comprising a lever 60 pivoted at 61 to the frame 12 of the counting mechanism, and having one end of a suitable spring 62 adjustably secured thereto by means of a suitable adjusting device, as indicated at 60' in Figure 1. The opposite end of the spring 62 is suitably attached to the frame 12 of the counting mechanism, and this spring constantly urges the lever 60 towards the cam plates 41 and 43.

A cam engaging member or finger 63 is adjustably mounted upon the lever 60 and is arranged to engage the cam-shaped periphery 41' of the cam plate 41, as shown in Figures 5 and 6. The cam engaging member or finger 63 is shown supported in a resilient U-shaped bracket 81 having one end fixedly secured to the lever 60 by a suitable stud 82 having a nut 82' received in threaded engagement therewith for securing the bracket 81 to the lever 60. One end of the stud 82 is anchored to the lever 60 by a transverse pin 85 which has an elongated head 85' projecting through a suitable guide aperture 85" in the bracket 81.

A spacing collar 83 is interposed between the lever 60 and one end of the bracket 81, thereby to increase the length of the bracket whereby the opposite end thereof, to which the cam finger 63 is secured, may be laterally adjusted with respect to the lever 60 to accurately time the finger 63 with the drop-off shoulder 42 of the cam face 41'. An adjusting screw 84 is rotatably received in an aperture provided in the bracket 81, and is threadedly engaged with the head of the stud 82. Rotation of the adjusting screw 84 will laterally adjust the cam finger 63 with respect to the median plane of the lever 60, as will readily be understood by reference to Figure 6.

The above described adjusting means provides a very efficient and practical device for adjusting the cam finger 63 to the exact point where it will drop off the shoulder 42 at the identical moment when the rear edge of each blank leaves the counter rollers 15 and 18.

The upper end of the lever 60 has one end of a rod 65 adjustably secured thereto by a stud 64 which is pivotally mounted in the lever 60. The stud 64 has a socket therein adapted to receive the rod 65, and the head of the stud 64 is preferably split and has a clamping screw 66 whereby the rod may be securely clamped in adjusted position in the stud 64, as will readily be understood by reference to Figures 1 and 2.

The opposite end 65' of the rod 65 is pivotally connected to a short arm e, secured to the upper end of a rock shaft d, mounted in a vertically disposed tubular supporting member c, adjustably mounted upon a horizontal supporting bar a by a suitable clamping device b. The supporting bar a is fixedly secured to the supporting frame 2 of the article forming machine, as illustrated in Figure 15.

An arm f is secured to the lower end of the shaft d and carries at its outer end a depending finger g which is hinged thereto. The finger g is normally disposed adjacent the path of the blanks or articles 5, which are conveyed through the receiving means B by conveyor belts h and i, from which conveyor belts the articles are discharged onto a slow moving conveyor belt j in overlapped relation.

Figure 14:
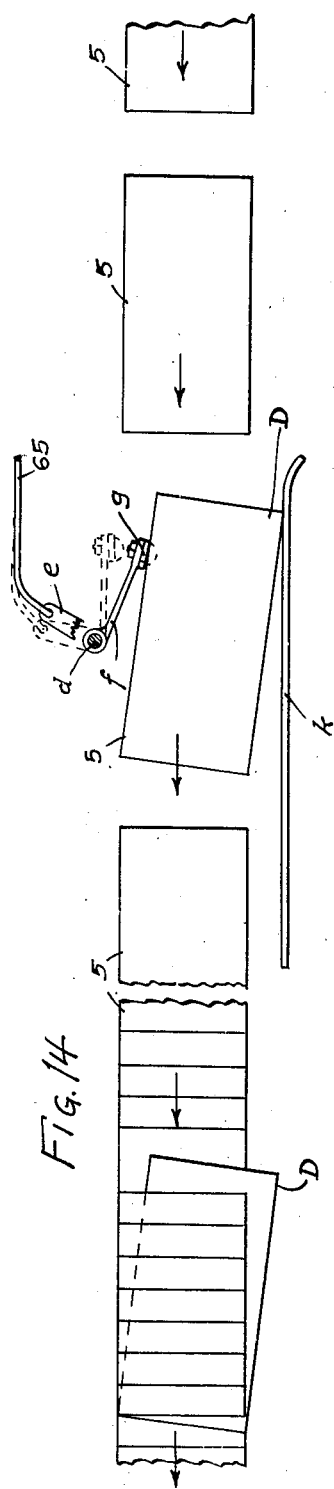
Figure 14 is a diagrammatic plan view illustrating the action of the count indicator on certain blanks delivered to the receiving conveyor.

The count indicating or article displacing mechanism shown in Figure 15 is actuated by the cam face 41' of the cam plate 40, and laterally displaces certain articles from their normal path of travel, as indicated at D in Figure 14, during operation of the machine. A suitable stop bar k is provided alongside the conveyor belts h and i to limit the outward movement or displacement of the rear end portions D of the articles displaced by the article displacing finger g.

Thus the articles delivered onto the conveyor j in overlapped relation will be arranged thereon in groups, which groups will be clearly defined by the laterally displaced articles D, as clearly illustrated in Figure 14. The number of articles in each group will be determined by the number of teeth in the escapement wheel 34, and may readily and conveniently be varied by simply substituting an escapement wheel having more or less teeth, depending upon the number of articles to be contained in each group.

Because the rotative relationship between the cam plate 41 and the escapement wheel 34 may vary somewhat due to the gripping and releasing action of the spring 38 upon the driving collar 36, the cam 41 cannot always be depended upon to release the cam finger 63 of the blank displacing device in timed relation to the movement of the articles through the counting mechanism. To overcome this difficulty, means is therefore provided whereby the cam finger 63 cannot be released until the article to be engaged by the article displacing finger g is in the proper position to be engaged thereby.

To thus accurately time the article displacing mechanism with the escapement mechanism, a suitable timing lug 34' is secured to the upright annular flange of the escapement wheel, as shown in Figure 5. The outer end of the lug 34' is substantially flush with the highest point of the cam face 41', as clearly illustrated in Figure 6. The lug 34' is located directly below the cam face 41', and the terminal of the cam finger 63 is so positioned with respect to the cam face 41' and the timing lug 34', that when it drops off the high point of the cam face 41', it will engage the lug 34' which will momentarily prevent the finger 63 from dropping to the lowest point of the cam face 41'. The end of the lug 34' is preferably slightly beveled in a rearward direction, as clearly illustrated in Figure 6, whereby the escapement wheel may be rotated with less effort when the cam finger 63 is engaged with the lug 34'.

By the provision of the timing lug 34', overrunning of the shoulder or drop-off 42 of the cam face 41' will have no effect upon the timing of the article displacing mechanism, which is of utmost importance because should the article displacing mechanism be prematurely operated, the article displacing finger g might engage an article before it was released from the rollers 15 and 18, which obviously would result in damage to the article thus engaged by the finger g. By the provision of the timing lug 34', the cam finger 63 cannot prematurely drop into the low point of the cam face 41' because it will be prevented from so doing by the lug 34', which will positively retain it in its inoperative position until the escapement wheel 34 is operated to move the lug 34' out of engagement with the cam finger 63. This will be understood by reference to Figure 5, wherein it will be noted the lower portion of the finger 63 is disposed in the path of the upper portion of the lug 34', whereby the lug will temporarily engage and prevent the finger 63 from dropping into the low part of the cam face 41' until the lug is subsequently moved out of engagement with the finger, as shown in Figure 6.

As hereinbefore stated, the operation of the escapement wheel 34 is controlled entirely by the passage of the articles between the rollers 15 and 18, and as the operation of the article displacing mechanism is controlled entirely by the operation of the escapement wheel 34, it will readily be seen that in the article counting and count indicating mechanisms herein disclosed, there is little danger of any of the parts becoming inoperative, as a result of improper timing.

The clutch device provided in the escapement wheel 34, is important in that it assures an accurate count indication of the blanks, which was not always assured with the form of friction drive disclosed in my Patent No. 1,154,451, because its operation was dependent upon the accurate and delicate adjustment of certain springs. Due to the fact that the actual work of displacing the articles from their normal path of travel is accomplished entirely by the action of the spring 62, which must be under considerable tension to be sure that each article engaged by the displacement finger $g$ will be laterally displaced sufficiently to engage the limit stop $k$, as shown in Figure 14, the cam finger 63 of the lever 60 engages the cam face 41' of the cam plate 41 with considerable pressure, which obviously causes friction and tends to retard the intermittent advance of the cam plate 41 and escapement wheel 34, each time the slide 30 is actuated by the arm 51.

The novel clutch device or mechanism herein disclosed, provides a positive drive for the cam plate 41 from the constantly rotating shaft 25, whereby the intermittent rotation of the cam plate is not dependent upon a spring-actuated friction drive such as illustrated in my hereinbefore mentioned patent.

In the operation of the novel article counting and count indicating mechanism herein disclosed, the articles are fed between the rollers 15 and 18 from the article forming machine, as shown in Figures 1 and 15. As each article enters between the rollers 15 and 18, the roller 18 is slightly elevated, which rocks the shaft 21 and thereby oscillates the arm 51 and moves the slide 30 of the escapement mechanism in a direction towards the right, when viewed as shown in Figures 1, 4 and 5.

Such action of the slide will cause the tooth 46 thereof to enter between adjacent teeth of the escapement wheel 34 and thereby advance or rotate it one-half tooth. Such advancement of the escapement wheel will permit the clutch spring 38 to grip the drive collar 36 and impart rotation to the cam-supporting member 40 and cam plates 41 and 43, because of the end 38" of the spring 38 being momentarily released from the stud 33' as a result of the stud 33' being moved forwardly by rotation of the escapement wheel 34. The gripping action of the spring on the collar 36 is, however, immediately released because of the end 38" of the spring again engaging the stud 33' with sufficient pressure to expand or partially unwind the spring.

When the trailing end of the article passes from between the rollers 15 and 18, the spring 59 will return the arm 51 to its normal position, whereby the slide is moved in a direction towards the left, when viewed as shown in Figures 4 and 5, thereby moving the tooth 47 of the slide into engagement with one of the teeth of the ratchet wheel whereby the escapement wheel will be advanced one-half tooth in a counter-clockwise direction, assisted by the light frictional engagement of the spring 38 with the drive collar 36, as hereinbefore stated. Such partial rotation of the escapement wheel will again cause the stud 33' to move away from the spring end 38", whereupon the clutch spring 38 again drivingly engages the collar 36 and imparts rotation to the cam plate 41.

From the foregoing, it will thus be noted that the actual work, or power required to drive the cam plate 41, is obtained from the drive shaft 25, as the intermittent rotation of the escapement wheel, by the reciprocal movement of the slide 30, intermittently rotates the escapement wheel relative to the cam plate 41, which controls the operation of the clutch device, including the spring 38 and collar 36, which, as above stated, transmits power from the shaft 25 directly to the cam plate 41.

Article forming machines are frequently operated at high speeds, as, for example, 2,000 articles per minute. The article counting mechanism must therefore be capable of accurately counting the articles as they pass through the machine at such high speeds. The novel counting and count indicating mechanisms herein disclosed have proven very efficient and practical in actual operation in connection with high speed article forming machines, which is due largely to the fact that the actual speed in revolutions per minute of the counting mechanism, including the escapement wheel 34, is only one-half of the number of articles discharging from the machine per minute. In other words, if the article forming machine is operating at a speed of 2,000 articles per minute, the escapement wheel 34 will be operating at a relatively slower speed because of being intermittently driven by operation of the escapement slide or bar 30, whereby there is less danger of the counting mechanism becoming inaccurate.

In Figures 7 and 8 I have shown a clutch device of somewhat different construction, which may be referred to as a roller type clutch. This clutch comprises a cam-supporting member 70, corresponding to the member 40 shown in Figures 4 and 5. The member 70 has a recess or clearance slot 71 therein for receiving the stud 33', secured to the escapement wheel 34. A vertically disposed roller 72 is mounted in the recess 71 and is adapted to engage the periphery of the drive collar 36 and an inclined wall portion or face 75' of the recess 71. A small pin 73 is mounted in an aperture in the member 70 and has one end engaging the roller 72. The opposite end of the pin 73 is engaged by a spring element 74 having one end fixed in the member 70. The spring element 74 constantly urges the roller 72 in a forward direction, or in a direction towards the stud 33'.

The clutch device illustrated in Figures 7 and 8 operates in a manner very similar to the spring type clutch shown in Figures 4 and 5, in that when the stud 33' is advanced, as a result of the escapement wheel being rotated one step by movement of the slide 30 in one direction, the spring 74 will force the clutch roller 72 forwardly, whereby the frictional engagement of the drive collar 36 with the periphery of the roller 72, will cause the roller 72 to temporarily become wedged between the inclined face 75' of the member 70 and the periphery of the collar 36, whereby the member 70 is positively driven in a forward direction, until the clutch roller 72 again engages the stud 33'.

The escapement wheel 34 shown in Figures 7 and 8, is slightly different in construction from the one shown in Figures 4 and 5, in that the hub 32 thereof has been enlarged to receive a relatively smaller elongated hub 70' provided on the member 70. The hub 70' of the cam-supporting member 70 is mounted for relative rotation upon the upper reduced end portion 25' of the shaft 25.

In connection with the roller type clutch illustrated in Figures 7 and 8, I prefer to provide means for preventing reverse movement of the cam-supporting member 70. To accomplish this, a check roller 75 is mounted in a recess 77 provided in a block 79 secured to the frame 12 of the counting mechanism by suitable screws 80, as best shown in Figure 9. The roller 75 is adapted to engage the periphery of the hub 70' of the member 70 and also an inclined wall or face 76 of the recess 77. A spring-actuated pin 78 constantly bears against the check roller 75 and tends to force it into wedging engagement with the periphery of the hub 70' and the inclined face 76, whereby the roller 75 will positively lock the hub 70' against reverse rotation, as will readily be understood by reference to Figure 9.

In Figures 10, 11 and 12 I have shown a clutch device of the chain type, which has proven very efficient and practical in actual operation. This clutch comprises a section of chain 86 which is almost completely wrapped around a driving member or collar 36, which is keyed or otherwise secured to the upper reduced end portion 25' of the shaft 25, as shown. The member 36, shown in Figure 11, corresponds to the driving collar 36 shown in Figures 4 and 5.

One end of the chain 86 is anchored to a pin 88 secured to the cam plate 41, as best illustrated in Figure 12. The opposite end of chain 86 is secured to the upright flange of the escapement wheel 34 by suitable means such as a link 87, fitted into a slot or open recess provided in the flange of the escapement wheel. A suitable spring 100 has one end secured to the link 87, or to the adjacent end of the chain, and the opposite end of said spring is secured to a pin 88 fastened to the cam plate 41.

The spring 100 functions to constantly exert a pull on the ends of the chain 86 to contract the chain about the driving member 36 and cause it to drivingly engage the member 36.

The operation of the chain type clutch shown in Figures 10, 11 and 12, is very similar to the operation of the spring type clutch shown in Figures 4 and 5 and the roller type clutch shown in Figures 7 and 8, in that it intermittently transmits power from the shaft 25 to the cam plate 41, and its operation is controlled entirely by the intermittent operation of the escapement wheel 34 by the slide 30.

The chain 86 and spring 100 are so proportioned and related that the chain, when partially released or "expanded", will still engage the periphery of the drive collar 36 with a very light friction which, however, is enough to cause the drive collar 36 to constantly exert a slight driving force on the escapement wheel 34, whereby the escapement wheel may be intermittently rotated with very little effort, when the slide 30 is operated.

In other words, because of the spring 100 constantly operating to contract the chain into frictional engagement with the periphery of the constantly rotating driving member 36, a light driving force is constantly being transmitted to the escapement wheel 34 as a result of one end of the chain being anchored thereto. This driving force, however, is extremely light, when the escapement wheel is locked against rotation by the tooth 46 of the slide 30, as shown in Figure 10, because when the escapement wheel is thus temporarily restrained against rotation, the frictional engagement of the driving member 36 with the chain 86 tends to elongate the spring. Such slight elongation of the spring causes the chain to slightly unwind, thereby reducing the gripping action between the chain member 86 and the constantly rotating member 36. The instant, however, that the slide 30 is actuated to move the tooth 46 out of engagement with the escapement wheel and simultaneously move the tooth 47 into engagement therewith to partially rotate it, the spring 100 again causes the chain to drivingly engage the periphery of the driving member 36, whereby very little effort is required of the slide 30 to impart intermittent rotation to the escapement wheel.

In Figures 10 and 11 the cam plate 41 is shown rotatably mounted upon a hub 36' of the clutch member 36, by a suitable anti-friction bearing, generally designated by the numeral 101. A suitable flanged cap nut 102 is received in threaded engagement with the upper reduced end portion of the shaft 25 to secure the clutch member 36 on the shaft extension 25', and also to retain the cam plate 41 in proper position on the outer ball race of the anti-friction bearing 101.

In Figure 13, one end of the chain 86 is shown secured to the upright annular flange of the escapement wheel 34 by a stud 103 which may be loosely attached to said flange. The inwardly extending end portion of the stud 103 is arranged to enter between two adjacent links of the chain 86, thereby to detachably connect the chain to the escapement wheel 34. The stud 103 may be fitted into an open recess or slot provided in the flange of the escapement wheel, as will be understood by reference to Figure 13.

The operation of the mechanisms shown in Figures 10 and 13 are substantially identical to the structures shown in Figures 4 and 7, the important features of the various mechanisms residing in the slight relative movement between the escapement wheel and the cam plate, to automatically control the operation of the various follow-up clutches illustrated in Figures 4—7 and 10 and 13.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus for counting paper articles, an article counter, a count indicator, a continuously rotating member, an escapement member, an article-actuated mechanism for operating the escapement member, cam means for operating the count indicator, and a follow-up power actuator comprising means under control of the escapement wheel for transmitting power from the rotating member to the cam means, when the escapement wheel is rotated relative to the cam means.

2. In an apparatus for counting paper articles, an article counter, a count indicator, a continuously rotating friction member, an escapement member, an escapement wheel operatively associated with the escapement member, an article-actuated mechanism for operating the escapement member, cam means for operating the count indicator, and a power actuator comprising means under control of the escapement wheel for intermittently transmitting power from the rotating friction member to the cam means when the escapement wheel is rotated relative to the cam means.

3. In an apparatus for counting paper articles, an article counter, a count indicator, a continuously rotating friction surface, an escapement member, an escapement wheel operatively associated with the escapement member, cam means for operating the count indicator, an article-actuated mechanism for operating the escapement member, a spring-actuated clutch device for intermittently transmitting power from the rotating friction surface to the cam means, and means carried by the escapement wheel and having an operative connection with said clutch device and adapted upon movement of the escapement wheel relative to the cam means, to cause the clutch device to intermittently transmit power from the shaft to the cam means.

4. In an apparatus for counting paper articles, an article counter, a count indicator, a continuously rotating shaft, an escapement member, an escapement wheel operatively engaged with the escapement member, an article-actuated mechanism for operating the escapement member, cam means for operating the count indicator, a friction clutch, and an element carried by the escapement wheel and having an operative connection with the friction clutch whereby movement of the escapement wheel relative to the cam means will render the clutch operable to intermittently transmit power from the shaft to the cam means.

5. In an apparatus for counting paper articles, an article counter, a count indicator, a continuously rotating shaft, an escapement member, an escapement wheel operatively engaged with the escapement member, an article-actuated mechanism for operating the escapement member including coacting rollers between which the articles are fed, cam means for operating the count indicator, a clutch device, and means fixed to the escapement wheel and operatively engaged with the clutch device whereby when the escapement wheel is rotated with respect to the cam means, said clutch device is rendered operable to intermittently transmit power from the shaft to the cam means.

6. In an apparatus for counting flat articles, a total article counter, count indicating means, a continuously rotating shaft, an escapement member, an escapement wheel operatively engaged with the escapement member, an article-actuated mechanism for operating the escapement member, cam means for operating the counter and count indicating means, a clutch device operatively connecting the shaft to the cam means, and a clutch control element carried by the escapement wheel and operatively associated with the clutch device whereby when the escapement wheel is rotated relative to the cam means, said control element will cause the clutch device to intermittently transmit power from the shaft to the cam means.

7. In an apparatus for counting flat articles, an article feeding means, a drive shaft, a total article counter, a count indicating device, an escapement wheel, an article-actuated mechanism for intermittently operating the escapement wheel, dual cam means for operating the total article counter and the count indicating device, a spring-actuated clutch for intermittently transmitting power from the continuously rotating shaft to the dual cam means, and a control element carried by the escapement wheel adapted to automatically control the operation of the clutch when the escapement wheel is rotated with respect to the cam means.

8. In an apparatus for counting paper articles, an article feeding means, a drive shaft, means for counting the articles including a count indicating device, a receiving means for the counted articles, said count indicating device comprising a member for laterally displacing selected articles from their normal path of travel on said receiving means, thereby to group the articles, an escapement wheel, an article-actuated mechanism for intermittently operating the escapement wheel, a cam plate having a peripheral cam face provided with a drop-off, said count indicating device including a pivoted arm provided with a cam-engaging element, spring means connected to said arm for constantly holding the cam-engaging element against the cam face, and a timing element carried by the escapement wheel and positioned adjacent to the drop-off of the cam face whereby when the high point of the cam moves out of engagement with the cam-engaging element, said cam element will be momentarily restrained against movement by said timing element to prevent premature operation of the count indicating device until the escapement wheel is again actuated by the trailing end of an article passing through said article-actuated mechanism.

9. In an apparatus for counting paper articles, an article feeding means, a drive shaft, means for counting the articles including a count indicating device, a receiving means for the counted articles, said count indicating device comprising a member for laterally displacing selected articles from their normal path of travel on said receiving means, thereby to group the articles, an escapement wheel, a blank-actuated mechanism for intermittently operating the escapement wheel, a cam plate having a peripheral cam face provided with a drop-off, said count indicating device including a pivoted arm provided with a cam-engaging element, spring means connected to said arm for constantly holding the cam-engaging element against the cam face, a timing element carried by the escapement wheel and positioned adjacent to the drop-off of the cam face whereby when the high point of the cam moves out of engagement with the cam-engaging element, said cam element will be momentarily restrained against movement by said timing element to prevent premature operation of the count indicating device until the escapement wheel is again actuated by the trailing end of an article passing through said article-actuated mechanism, and a clutch device made operable by movement of the escapement wheel to transmit power from the shaft to the cam plate.

10. In an apparatus for counting articles, a continuously rotating clutch member having a smooth periphery, an article-actuated mechanism including an escapement wheel, a flexible friction element substantially encircling the clutch member and having one end attached to the escapement wheel, a light spring connecting together the ends of the friction element, whereby said element normally engages the periphery of the rotating clutch member with a light pressure whereby to cause a slight but constant frictional pull on the escapement wheel, a spring-actuated article displacing unit, means associated with the escapement wheel for tensioning and tripping said unit, and means controlled by operation of the escapement wheel by the passage of an article through the apparatus to periodically cause the flexible friction element to drivingly engage the clutch member to thereby reset the tensioning and tripping means.

11. In an apparatus for counting articles, a continuously rotating drive member having a smooth periphery, an article-actuated mechanism including an escapement wheel, a chain element substantially encircling the drive member and having one end attached to the escapement wheel, a light spring connecting together the ends of the friction element, whereby said element normally engages the periphery of the rotating drive member with a light pressure whereby to cause a slight but constant frictional pull on the escapement wheel, a spring-actuated article displacing unit, cam means adjacent to the drive member for tensioning and tripping said unit, means connecting the opposite end of the chain element to the cam means, and the driving engagement of the chain element with the drive member being automatically controlled by movement of the escapement wheel relative to the cam means as a result of articles being successively fed through the counting mechanism.

12. In an apparatus for counting articles, an article-actuated mechanism including an escapement wheel, clutch means including a continuously rotating drive member having a smooth periphery, a cam-supporting member having a recess therein, one side of which is open to the periphery of the drive member, said recess having an angularly disposed wall portion, a clutch roller in said recess adapted to engage the periphery of the drive member and said angularly disposed wall portion, thereby to drivingly connect the cam-supporting member to the drive member, a cam secured to the cam-supporting member, an article displacing unit including a spring-actuated arm having means normally engaging the periphery of the cam, and means carried by the escapement wheel for controlling the driving engagement of the clutch roller with the drive member and whereby the operation of the clutch means is controlled entirely by movement of the escapement wheel relative to the cam-supporting member by the feeding of articles through the apparatus.

13. In a mechanism for counting flat articles, an escapement bar cooperating with an escapement wheel, means including the movement of flat articles for actuating said escapement bar, a count indicator, a cam member for actuating the count indicator, a follow-up clutch disc operated by a continuously revolving shaft from a suitable source of power, a clutch member engaging the outer surface of said follow-up clutch disc, said clutch member having one end secured to said cam member and the other end to said escapement wheel, and a spring joining the two ends of said clutch member, whereby movement of the escapement wheel relative to the cam member controls the movement of the cam member.

14. In a mechanism for counting flat articles, an escapement bar, an escapement wheel cooperating with said escapement bar, means including the movement of flat articles for actuating said escapement bar, a continuously revolving friction surface, means for driving said continuously revolving friction surface, a count indicator, a cam member for actuating the count indicator, means cooperating with said revolving friction surface for advancing said cam member, said means being controlled by movement of said escapement wheel relative to the cam.

15. In a mechanism for counting flat articles, an escapement bar, an escapement wheel cooperating with said escapement bar, a continuously revolving friction surface, means for driving said continuously revolving friction surface, a count indicator, a cam member for actuating the count indicator, means cooperating with said revolving friction surface for advancing said cam member, and means for transferring the load of the count indicator from the cam member to the escapement wheel before the count indicator is actuated.

EDWIN G. STAUDE.